Patented Aug. 11, 1953

2,648,677

UNITED STATES PATENT OFFICE 2,648,677

ADDITION PRODUCT OF THIANAPHTHENE SULFONE AND MALONIC ACID ESTERS

Wilbur H. McKellin, Somerville, N. J., Frederick G. Bordwell, Evanston, Ill., and Otto C. Elmer, Fishkill, N. Y., assignors to The Texas Company, New York, N. Y., a corporation of Delaware No Drawing. Application September 16, 1950, Serial No. 185,334

4 Claims. (Cl. 260—330.5)

This invention relates to novel compounds derived from thianaphthene-1-dioxide. More specifically, the novel compounds of this invention are addition products of thianaphthene-1-dioxide and negatively di-substituted methanes.

The novel compounds of this invention are derivatives of 2,3-dihydrothianaphthene-1-dioxide in which a negatively di-substituted methyl group is substituted in the 3-position. The novel compounds of this invention can be generically designated as 3-negatively di-substituted methyl-2,3-dihydrothianaphthene-1-dioxides which have the general formula:

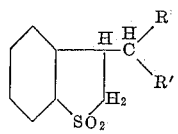

wherein R and R' are negative radicals. The acetyl group, the nitrile radical, and the carbalkoxy and carboxy groups are examples of negative groups which can be attached to the negatively di-substituted methyl group located on the three position of the novel adducts of this invention. Malonic acid esters, ethylcyanoacetate and acetoacetic ester are negatively di-substituted methanes that react with thianaphthene-1-dioxide to form the novel compounds of this invention.

The novel compounds of this invention are useful as pesticides, pharmaceuticals, lube oil additives and as intermediates in the preparation of such compounds. The novel adducts are particularly useful as chemical intermediates because the two negative groups on the methyl radical attached to the 3-position of 2,3-dihydrothianaphthene-1-dioxide offer opportunities for further synthetic reactions.

The novel compounds of this invention are readily prepared by reacting the sodium salts of the negatively di-substituted methanes with thianaphthene-1-dioxide. This mode of preparation will be illustrated hereafter by reaction of thianaphthene-1-dioxide with diethylmalonate, ethylacetoacetate and ethylcyanoacetate. Although the reaction of thianaphthene-1-dioxide and the sodium salts of the negatively di-substituted methanes provides an expeditious procedure for forming the novel compounds of this invention, it will be understood that the compounds of this invention are in no way restricted to any one mode of preparation.

Example I 0.28 g. of sodium sand was suspended in 75 cc. of dry benzene and 3.86 g. of malonic ethyl ester added thereto; the resulting mixture was refluxed overnight. 2.0 g. of thianaphthene-1-dioxide dissolved in 50 cc. of dry benzene was added to the white suspension formed when the refluxed mixture was cooled. The resulting reaction mixture was stirred at 50° C. for 6 days without any change in appearance. 100 cc. of water was then slowly added and the reaction mixture was made strongly acid with concentrated hydrochloric acid. The benzene layer was separated from the acidified mixture and washed. After evaporation of the benzene layer, there was obtained 3.35 g. of crystals melting at 65 to 80° C. This amounted to an 86 per cent yield of 3-dicarbethoxymethyl-2,3-dihydrothianaphthene-1-dioxide. The product was purified by dissolving in benzene and treating it with a few drops of 2 per cent potassium permanganate solution to remove traces of unreacted thianaphthene-1-dioxide. The excess permanganate was used up with dilute sodium bisulfite solution. The benzene solution was then washed and 3-dicarbethoxymethyl-2,3-dihydrothianaphthene-1-dioxide was obtained by evaporation of the benzene. After recrystallization of this product from dilute alcohol there was obtained a product melting at 84.5 to 85.5° C. Analysis of this product indicated that it contained 55.14 per cent carbon and 5.50 per cent hydrogen as compared with calculated theoretical values of 55.20 per cent and 5.56 per cent for the elements in the order named. 3-dicarbethoxymethyl-2,3-dihydrothianaphthene-1-dioxide has the following structural formula:

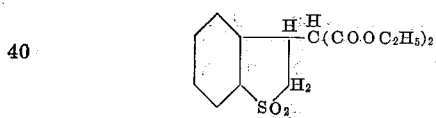

Example II

Sodium sand in the amount of 12.5 g. was suspended in 200 cc. of dry benzene and 70 g. of ethylacetoacetate was added thereto slowly and with continuous stirring and cooling. After the addition of the ethylacetoacetate was complete, the reaction mixture was refluxed for 8 hours. The mixture was cooled and 83 g. of thianaphthene-1-dioxide dissolved in 250 cc. dry benzene was added thereto. The resulting reaction mixture was refluxed for 7 hours at which time the solid cake deposit on the walls of the reaction flask was broken up and the mixture re-heated under reflux for another hour. To the cooled reaction mixture 500 cc. of water was slowly added, after which the aqueous layer was decanted from the reaction mixture and made acid to Congo red paper by addition of 5 per cent aqueous hydrochloric acid. The acid solution was extracted with benzene and the benzene extract was dried over anhydrous sodium sulfate. After removal of benzene by distillation, there was obtained 135 g. of a yellow oil which had a refractive index of 1.5381 at 60° C. and a specific gravity of 1.2481 at 60° C. This oil is the adduct of ethylacetoacetate and thianaphthene-1-dioxide and is designated at 3-(aceto carbethoxymethyl), 2,3-dihydrothianaphthene-1-dioxide, to which the following structural formula is assigned:

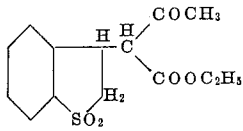

The identity of this compound was established by caustic decarboxylation to an acetonyl derivative of dihydrothianaphthene-1-dioxide. A portion of the yellow oil was hydrolyzed with 15 per cent aqueous sodium hydroxide and the resulting alkaline solution was extracted with ether. The ether extract was dried and evaporated whereby there was obtained a solid residue which was recrystallized from water. The recrystallized material melted at 132 to 132.5° C. and analyzed 59.1 per cent carbon, 5.25 per cent hydrogen, 14.16 per cent sulfur as compared with calculated theoretical values of 59.9 per cent carbon, 5.4 per cent hydrogen and 14.3 per cent sulfur for 3 - acetonyl-2,3-dihydrothianaphthene-1-dioxide. The infra-red and ultra-violet absorption spectra confirmed that the crystalline solid was 3-acetonyl-2,3-dihydrothianaphthene-1-dioxide.

*Example III*

Sodium sand in an amount of 7.0 g. was suspended in 200 cc. of dry benzene and 34.5 g. of ethylcyanoacetate in 200 cc. of dry benzene was slowly added thereto with constant stirring. The resulting turbid mixture was refluxed for 16 hours until all of the sodium had disappeared. The mixture was cooled, 50 g. of thianaphthene-1-dioxide in 300 cc. of dry benzene was added thereto and the reaction mixture was heated under reflux with stirring for a period of 3 hours. The reaction mixture was blanketed with carbon dioxide and 200 cc. of water were added thereto. Dilute hydrochloric acid was added until the aqueous layer was acid to litmus. After separation of the layers, there separated from the aqueous portion a white crystalline solid which melted at 123–124° C. after recrystallization from water-ethanol.

The neutralization equivalent of this crystalline material was 245 indicating it to be 3-cyanocarboxymethyl - 2,3 - dihydrothianaphthene-1-dioxide (theoretical neutral equivalent-251), which is formed by the hydrolysis of the 3-cyanocarbethoxymethyl - 2,3 - dihydrothianaphthene-1-dioxide, the adduct of thianaphthene-1-dioxide and ethylcyanoacetate. The white crystalline solid analyzed 51.54 per cent carbon, 3.95 per cent hydrogen, 12.01 per cent sulfur and 5.24 per cent nitrogen as compared with calculated theoretical values of 52.7 per cent carbon, 3.61 per cent hydrogen, 12.75 per cent sulfur and 5.58 per cent nitrogen for 3-cyanocarboxymethyl-2,3-dihydrothianaphthene-1-dioxide.

The benzene layer was stripped of benzene and subjected to vacuum distillation at 0.2 mm. whereupon the viscous residue decomposed. Apparently the 3-cyanocarbethoxymethyl-2,3-dihydrothianaphthene-1-dioxide decomposes on distillation. The identity of the oily liquid obtained on benzene stripping was established by caustic decarboxylation and hydrolysis of the nitrile group to produce 3-carboxymethyl-2,3-dihydrothianaphthene-1-dioxide.

A portion of the oil was refluxed with an excess of 15 per cent aqueous sodium hydroxide for 10 hours, after which the resulting mixture was acidified and extracted with ether. The ether extract was evaporated whereby there was obtained a white solid that recrystallized from water. The recrystallized material had a melting point of 134 to 135° C. and was identified as 3 - carboxymethyl-2,3-dihydro-3-thianaphthene-1-dioxide by a mixed melting point with a sample of the known compound.

The foregoing examples illustrate one mode of preparing the novel 3-negatively di-substituted methyl - 2,3 - dihydrothianaphthene - 1 - dioxide compounds of this invention. It will be understood that adducts can be prepared from thianaphthene-1-dioxide and other negatively di-substituted methanes. For example, higher molecular weight esters of malonic acid and malonic nitrile are examples of other negatively di-substituted methanes that react with thianaphthene-1-dioxide to form the novel compounds of this invention.

Obviously, many modifications and variations of the invention as hereinbefore set forth may be made without departing from the spirit and scope thereof and, therefore, only such limitations should be imposed as are indicated in the appended claims.

We claim:

1. 3-negatively di-substituted methyl-2,3-dihydrothianaphthene-1-dioxide compounds having the following general formula:

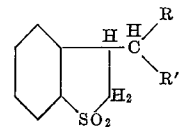

wherein R and R' are negative radicals selected from the group consisting of carboxy and carbalkoxy radicals, the nitrile radical and the acetyl radical.

2. 3 - dicarbethoxymethyl - 2,3 - dihydrothianaphthene-1-dioxide.

3. 3 - (acetocarbethoxymethyl) - 2,3 - dihydrothianaphthene-1-dioxide.

4. 3-(cyanocarboxymethyl) - 2,3 - dihydrothianaphthene-1-dioxide.

WILBUR H. McKELLIN.
FREDERICK G. BORDWELL.
OTTO C. ELMER.

References Cited in the file of this patent

Bordwell and McKellin: J. Am. Chem. Soc., 72, 1985–1988 (May 1950).